United States Patent
Serrano et al.

(10) Patent No.: US 6,226,140 B1
(45) Date of Patent: May 1, 2001

(54) SHOCK DETECTOR IN A DISK DRIVE SERVO CONTROL SYSTEM

(75) Inventors: Louis Joseph Serrano; Mantle Man-Hon Yu, both of San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/115,490

(22) Filed: Jul. 14, 1998

(51) Int. Cl.$^7$ .................................................. G11B 19/04
(52) U.S. Cl. .................. 360/60; 360/75; 360/31; 360/53
(58) Field of Search ................... 360/60, 75, 31, 360/53, 77.08

(56) References Cited

U.S. PATENT DOCUMENTS

| | | |
|---|---|---|
| 4,807,063 | 2/1989 | Moteki . |
| 4,809,120 | 2/1989 | Ozawa . |
| 4,833,551 | 5/1989 | Song . |
| 4,896,228 | 1/1990 | Amakasu et al. . |
| 4,924,160 | 5/1990 | Tung . |
| 5,126,895 | 6/1992 | Yasuda et al. . |
| 5,132,854 | 7/1992 | Tsuyoshi et al. . |
| 5,270,880 | 12/1993 | Ottesen et al. . |
| 5,392,290 | 2/1995 | Brown et al. . |
| 5,477,402 | 12/1995 | Elliott et al. . |
| 5,570,244 | 10/1996 | Wiselogel . |
| 5,663,847 | * 9/1997 | Abramovitch .................... 360/77.02 |
| 5,777,815 | * 7/1998 | Kasiraj et al. ......................... 360/75 |

FOREIGN PATENT DOCUMENTS

| | | |
|---|---|---|
| 55-150161 | 11/1980 | (JP) . |
| 59-52474 | 3/1984 | (JP) . |

OTHER PUBLICATIONS

*PTO 88–1091, Apr. 1988, English–language document indicated as corresponding to Document No. 55–150161 (Japanese Kokai) of Nov. 21, 1980.

* cited by examiner

*Primary Examiner*—Alan T Faber
(74) *Attorney, Agent, or Firm*—Abdy Raissinia

(57) ABSTRACT

A direct access storage device (DASD) servo control system detects a servo pattern recorded in multiple cells of a servo sector and compares the cell-to-cell readback signal independently of the position error signal (PES). A servo sector of the disk contains multiple servo identification cells such that a servo readback signal is generated for each cell. If the servo signal data from two successive cells of a single sector, or from the same cell of successive sectors, differs by an amount greater than a predetermined error threshold, then a physical jarring or shock is indicated and the servo control system causes a write inhibit command to the write channel.

28 Claims, 7 Drawing Sheets

SHOCK DETECTOR IN A DISK DRIVE SERVO CONTROL SYSTEM

BACKGROUND OF THE INVENTION

1. Field of the Invention

This invention relates generally to direct access storage devices and, more particularly, to control of arm movement in disk drive devices.

2. Description of the Related Art

In a conventional computer data storage system having a rotating storage medium, such as a magnetic or magneto-optical disk, data is stored in a series of concentric or spiral tracks across the surface of the disk. A magnetic disk, for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface. A read/write head produces and detects variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path centered over the selected track. Maintaining the head centered over a track facilitates accurate reading and recording of data. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo control systems.

Servo Control Systems

A servo control system generally maintains a read/write head in a position centered over a track by reading servo information recorded onto the disk surface. The servo information comprises a position-encoded servo pattern of high frequency magnetic flux transitions, generally flux reversals, that are pre-recorded in disk servo tracks. The flux transitions are recorded as periodic servo pattern bursts formed as parallel stripes in the servo tracks. When the read/write head passes over the servo pattern flux transitions, the head generates an analog signal whose repeating cyclic variations can be demodulated and decoded to indicate the position of the head over the disk. The position indicating information can be used to produce a corrective signal that is referred to as a position error sensing (PES) signal. The PES signal indicates which direction the head should be moved to remain centered over a selected track and properly read and write data.

There are a variety of methods for providing servo track information to a disk servo control system. In the dedicated servo method, one surface of a disk is completely recorded with servo track information. Typically, a servo head is positioned over the dedicated servo disk surface in a fixed relationship relative to multiple data read/write heads positioned over one or more other data disk surfaces. The position of the servo head relative to the dedicated disk surface is used to indicate the position of the multiple data read/write heads relative to their respective disk surfaces.

Another method of providing servo track information is known as the sector servo method. In the sector servo method, each disk surface includes servo track information and customer data recorded in concentric or spiral tracks. The tracks on a sector servo disk surface are partitioned by sectors having a short servo track information area followed by a data area. The servo track information area typically includes a sector marker, track identification data, and a servo burst pattern. The sector marker indicates to the data read/write head that servo information immediately follows in the track. The servo read head is typically the same head used for reading data.

FIG. 1 is a schematic representation of a conventional disk drive storage system 100 that includes one or more individual disks 102 on which are deposited a magnetic recording material for storing magnetically encoded information. The disk drive 100 also includes an actuator 104 with a read/write head 106. An actuator motor 108 pivots the actuator 104, thereby changing the position of the read/write head 106 with respect to concentric tracks 110 of data contained on the disk 102. The operation of the disk drive 100 is managed by a disk drive controller 112, which also serves as an interface between the disk drive 100 and a host computer 113.

The controller 112 includes a readback signal pre-amplifier 116 ("pre-amp"), which receives electrical representations of the flux changes sensed by the read/write head 106 from the disk 102. The pre-amp 116 serves a dual purpose by amplifying either data signals or servo signals, depending on whether the read/write head 106 is positioned over stored customer data or over servo pattern data, respectively. Thus, the amplified signal from the pre-amp 116 is directed to two processing channels: a servo channel 118 and a customer data channel 120. A write circuit 117 is provided to supply the read/write head 106 with customer data signals from the data channel.

The data channel 120 generally reads and writes data to and from the disk 102 in response to requests from the host computer 113 to read or write the data. The write circuit 117 is connected only to the customer data channel. The pre-amp 116, when operating in conjunction with the customer data channel 120, amplifies the disk readback signal from the read/write head 106 and directs the readback signal to an automatic gain control and filter circuit 121. A data pulse detector 122 receives the analog readback signal from the circuit 121 and forms digital data pulses corresponding to the analog signals. Next, a pre-host processor 124 converts the data pulses into formatted data strings that are compatible with the host computer 113. The components of the data channel 120 also operate in reverse order to write customer data to the disk 102.

The servo channel 118 generally reads servo data from the disk 102 to aid in properly positioning the read/write head 106. When operating in conjunction with the servo channel 118, the pre-amp 116 amplifies servo signals produced when the read/write head 106 senses servo patterns. The servo channel 118 includes an automatic gain control (AGC) and filter circuit 126, which may comprise any one of various known circuits for automatically adjusting the readback signal gain and filtering it. Next, a demodulator/decoder 128 receives the filtered readback signal and processes the information to derive a position error sensing (PES) signal, which is related to the position of the read/write head 106 with respect to the desired track center and is indicative of the read/write head position error. The PES signal is then used by a servo controller 130 to generate an input signal that, when provided to the actuator 104, controls the position of the read/write head 106.

The servo pattern is recorded into, and read from, tracks across the disk 118. In FIG. 1, circular, parallel lines 164 designate servo tracks of the disk, which are divided into sectors that are represented by radial lines 166. The servo tracks can include several repeated cycles of a servo pattern and can encompass one or more tracks of customer data.

Servo Signals

FIG. 2 shows a representation of various servo pattern bursts 138, 139, 140, 141 recorded on the surface of the disk 102. FIG. 2 also illustrates an amplitude-type servo readback signal 144 that is generated when the read/write head 106 is positioned above a first track 136. Each servo burst 138–141 is sensed and processed to provide servo signals that guide the read/write head 106 along one of the tracks 136–137. Those skilled in the art will recognize that the FIG. 2 servo bursts 138, 139, 140, 141 form a quadrature pattern, the bursts being commonly referred to by the designations A, B, C, and D, respectively. Although the A and B bursts 138, 139 most directly serve to guide the read/write head 106 in following the track 136, these two bursts also provide position information that is useful in guiding the head 106 along more remote tracks, such as the track 137. The illustrated servo pattern is referred to as an amplitude-type pattern because the amplitude of the readback signal is greatest when the head 106 is centered over one of the servo bursts, and decreases in amplitude as the head is moved away from the longitudinal center of a burst. Thus, because the head 106 is shown in FIG. 2 tracking a path centered over the C burst along the track 136, the portion of the readback signal 144 with the greatest amplitude is generated when the head is over the servo burst C.

Those skilled in the art will appreciate that the decoded servo signal 144 can be adversely effected by a variety of factors, including readback signal noise, run out error of the disk servo pattern, dynamics of the arm 104, and physical vibrations due to shock or other jostling of the disk drive system 100. Any one of these factors may cause an inaccurate servo signal, which can lead to mistracking, but the potentially most damaging source of error, and most difficult to overcome, is signal error due to shock.

Responding to Shock

As noted above, a disk drive system is sometimes subjected to a physical shock that can cause mistracking of the read/write head 106. When that occurs, read or write errors can occur. A misread is not especially problematic, because error checking circuitry generally results in an immediate re-read operation so that data is correctly read. A shock-generated write error, however, can result in non-recoverable data errors. To prevent such occurrences, some disk drive systems include a hardware shock sensor to detect when a shock occurs and generate a temporary write inhibit command that prevents writing to the disk when a shock has been detected.

Often, disk drives rely only on the PES signal from the surface of interest to detect a shock event. As track pitch increases, this provides increasingly inadequate coverage, since smaller off-track motion now has more serious consequences. The principle shortcoming is that time between PES samples is too long for the required protection, and decreasing that time requires writing more PES information and less customer data. Thus such a protection scheme negatively impacts the data capacity of the drive.

A hardware shock sensor typically includes one or more accelerometers that sense when forces are applied to the disk drive system 100 components, such as a housing of the system. Other processing equipment detects the signal generated by the accelerometers, processes the signals, and determines if a write inhibit command should be issued. Such detecting devices and processing equipment can add greatly to the cost of producing the disk drive system. Moreover, such hardware-implemented shock detectors may not always provide a precise indication of when a shock has occurred. For example, the accelerometers detect acceleration forces being experienced on whatever disk system component to which they are attached, but shock at that component may not indicate shock at the read/write head, which is where mistracking would occur. Attaching an accelerometer to the disk arm would provide greater accuracy, but increases the total arm mass that must be controlled by the servo.

From the discussion above, it should be apparent that there is a need for a direct access storage device that efficiently and accurately detects physical shocks. The present invention fulfills this need.

SUMMARY OF THE INVENTION

The present invention provides a direct access storage device (DASD) with a servo control system that detects a recorded servo pattern in multiple cells of a servo sector and compares the cell-to-cell readback signal independently of the position error signal (PES) to detect shock and cause write inhibit. A servo sector of the DASD contains multiple servo identification cells such that a servo readback signal is generated for each cell. In a multiple-disk DASD system, the servo information on the surface of a disk form wedge-patterns, radially aligned, similar to the spokes on a wheel. As the disk spins, these wedges periodically move under the readback head; for example, the wedges may occur every 100 microseconds ($\mu$sec) and last for 10 $\mu$sec, with eighty such wedges on a surface. This implies that the disk is spinning at 7500 RPM. The customer data is then written where the servo data isn't, in the 90 $\mu$sec space between the wedges.

From surface to surface these wedges need not align. That is, relative to a fixed point in time the wedges on a Surface 0 can start at time 0, 100 $\mu$sec, 200 $\mu$sec, etc. The wedges on a Surface 1 can start at time 20 $\mu$sec, 120 $\mu$sec, 220 $\mu$sec, etc. The wedges on a Surface 3 can start at time 40 $\mu$sec, 140 $\mu$sec, 240 $\mu$sec, and so on. Contrarily, the wedges on different surfaces can be aligned: in the above scheme Head 5 would naturally have wedges that start at times 0, 100 $\mu$sec, 200 $\mu$sec, etc., just as on Surface 0. In such a scheme, though, the first wedge on each surface is said to be in servo sector 0, the second in servo sector 1, etc., and each servo sector is subdivided into five cells, so that the wedges on Surface 0 and 5 fall into Cell 0, while the wedges on Surface 1 fall into Cell 1, etc.

The principle advantage of having the servo data from different surfaces occur at different times is that the availability of position information is subsequently increased. Now servo information is available from some surface at the end of each servo cell, instead of once per sector. This feature is used to improve the robustness of the disk drive to shock events.

Thus, the servo channel of the disk drive control system processes the servo readback signal for a sector cell of interest to generate a PES signal and also processes servo data for every cell of the servo sector to detect shock. Shock detecting logic of the servo control system compares servo data from each cell of a sector and determines if the DASD has experienced a shock that likely would cause erroneous data write operations. If the cell-to-cell servo data indicates a shock has occurred, then the servo control system inhibits data write operations. Shock detection and response can thereby be implemented without costly accelerometers, but with sufficient accuracy for effective shock response. In this way, the DASD detects physical shocks and responds with appropriate write inhibit commands without the extra cost, size, and weight of complicated hardware shock detection devices, such as accelerometers.

In one aspect of the invention, the disk drive system includes a conventional servo read channel that has one path for decoding the servo readback signal from a sector cell of interest, and has another path for decoding the servo readback signal from all cells during a sector processing interval. The all-cell processing path includes shock detector logic that compares the servo signal data from all cells of a sector. If the servo signal data from two successive cells of a single sector, or from the same cell of successive sectors, differs by an amount greater than a predetermined error threshold, then a shock is indicated and the system causes a write inhibit. In an alternative aspect of the invention, the disk drive system includes dual servo signal paths that each receive the servo readback signal and generate a PES, one path generating a PES for shock detection and the other generating a PES for servo and data detection.

In another aspect of the invention, the disk drive system includes a bandpass filter that recognizes frequency signatures of shocks typically suffered by disk drive systems. The shock detector of the disk drive system checks the PES for the presence of such frequency signatures and thereby improves the recognition of, and reaction to, typical shocks.

Other features and advantages of the present invention should be apparent from the following description of the preferred embodiment, which illustrates, by way of example, the principles of the invention.

DESCRIPTION OF THE PREFERRED EMBODIMENTS

Figure 3:
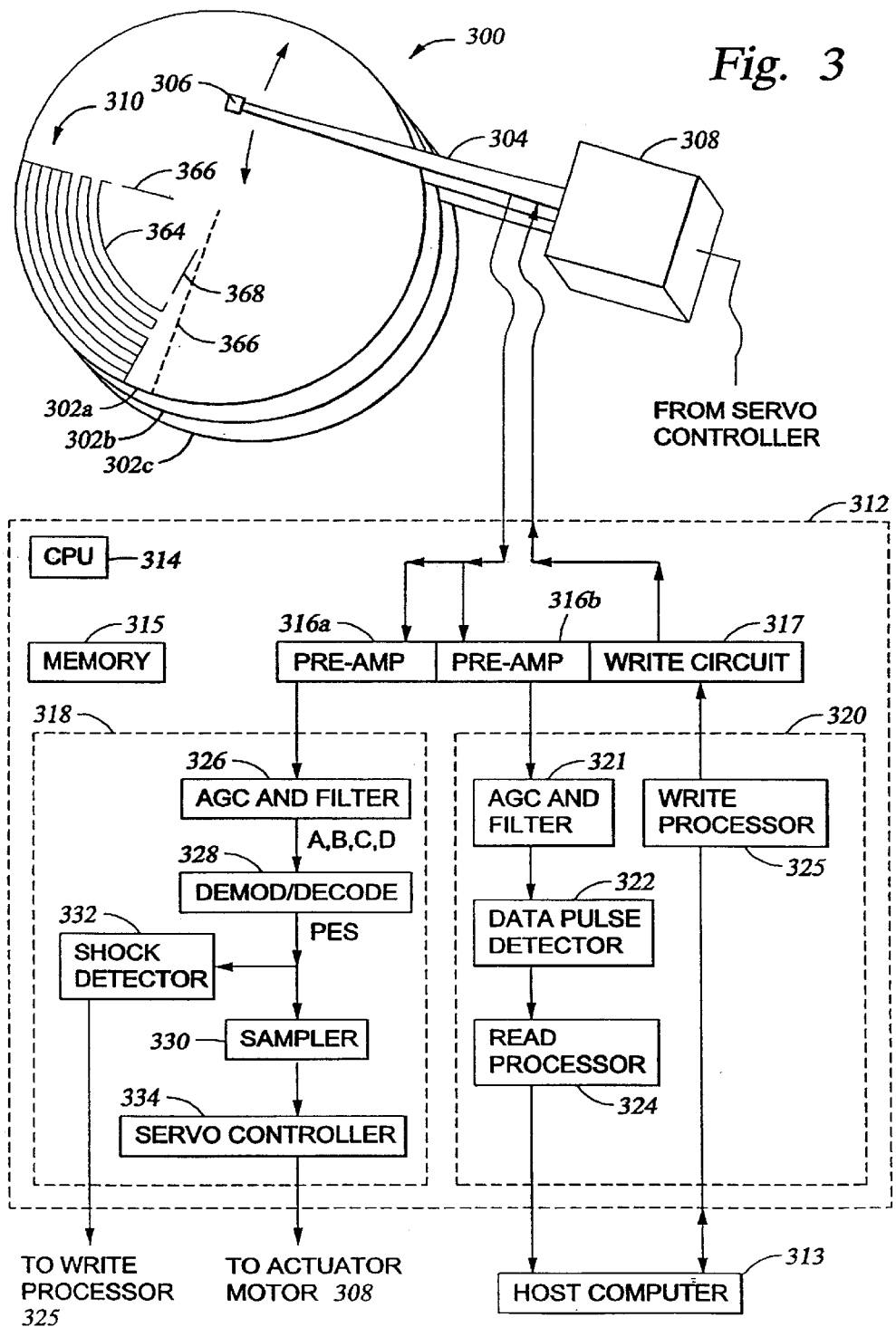
FIG. 3 is a schematic block diagram representation of a disk drive storage system constructed in accordance with the present invention.

FIG. 3 illustrates an exemplary direct access storage device (DASD) 300 comprising a disk drive constructed in accordance with the present invention. The DASD includes multiple disks whose top surfaces 302a, 302b, 302c are shown and on which are deposited a magnetic recording material for storing magnetically encoded information. It should be understood that the bottom surfaces of the disks have a similar construction. Although three disks are indicated in FIG. 3, it should be understood that the invention has applicability to disk drive systems with any number of disks consistent with the following description of operation. A reference to a single disk 302 should be understood to be a reference to the disks collectively. Moreover, where the device 300 is described with respect to one of the disks for ease of explanation, it should be understood that the description applies to each of the disks.

In accordance with the invention, read/write heads are moved across the disks 302 according to a sector servo control system wherein each servo information area of a disk sector is subdivided into cells. A position error sensing (PES) signal is generated using the servo readback signal from different cells. The readback signal from all the cells is continuously checked for a shock indication. The system 300 defines a shock to have occurred when there is a variation in the readback signal values from two sector cells that is greater than a predetermined shock threshold.

Figure 4:
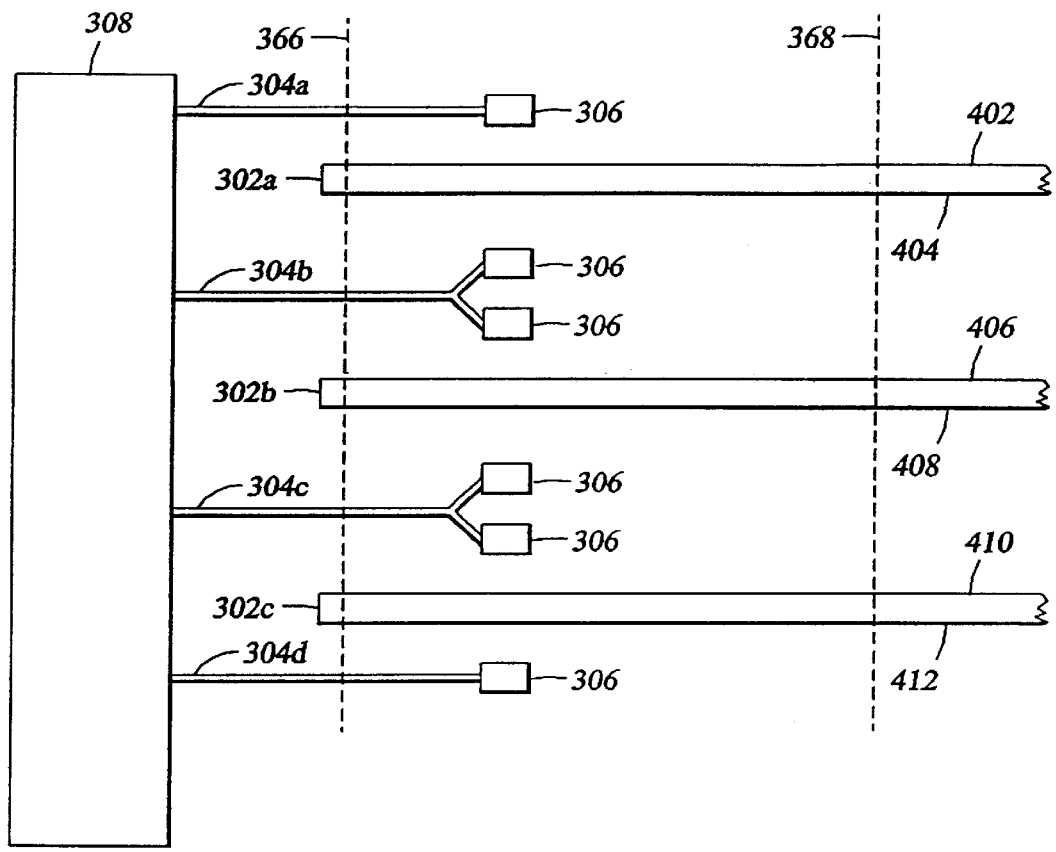
FIG. 4 is an elevation view of the disk surfaces in the multiple-disk, multiple-head disk drive storage system of FIG. 3.

The exemplary disk drive DASD system 300 is a sector servo system having three disks arranged in a coaxial fashion. Each disk has a top surface and a bottom surface, and so the three-disk system has six surfaces on which information can be recorded. FIG. 4 is a side elevation view of these disks. The system 300 makes use of some actuator arms that have double-suspension read/write heads, and therefore all six surfaces can be accessed with a total of only four arms, as shown in FIG. 4. The separation of disks and heads is exaggerated in FIG. 4 for clarity of presentation. As with the disks 302, the four arms 304a, 304b, 304c, 304d will be referred to collectively with one reference numeral 304. Each disk surface is provided with a read/write head 306 for transducing recorded information from the disk surfaces and for recording information onto the disk surfaces. An actuator motor 308 pivots all of the actuator arms 304 simultaneously, thereby changing the position of all the read/write heads 306 across the disks 302.

As depicted in FIG. 4, the first arm 304a moves a read/write head 306 that is used for accessing the top surface 402 ("Surface 0") of the first disk 302a only. The second arm 304b accesses the bottom surface 404 ("Surface 3") of the first disk 302a and the top surface 406 ("Surface 1") of the second disk 302b. The third arm 304c accesses the bottom surface 408 ("Surface 4") of the second disk 302b and the top surface 410 ("Surface 2") of the third disk 302c. The fourth arm 304d only accesses the bottom surface 412 ("Surface 5") of the third disk 302c.

Returning to FIG. 3, the first disk 302a is shown with concentric tracks 310 of information for a portion of disk 302a. Movement of the disk arms 304 is indicated by the arrows extending across the disk. Although rotary movement of the arms 304 is depicted for illustrative purposes, the disk drive system 300 may alternatively use another positioning scheme, such as linear extension/retraction of the arms. In FIG. 3, parallel circular lines 364 represent tracks of the disk, and dashed radial lines 366 represent sector-defining lines. As described more fully below, each sector is divided into cells.

A sector servo information area is defined in the area of a sector between a sector line 366 and a delimiting line 368 located toward one radial edge of the sector. In alternative embodiments, the dashed radial lines 366 and 368 may be curved. Servo track information is recorded in the sector servo information area, and customer data can be recorded in the disk area corresponding to the remainder of the sector. The servo track information includes a sector marker, track identification data, and a servo burst pattern. The sector marker indicates to the read/write head that servo information follows immediately in the track.

Figure 5A:
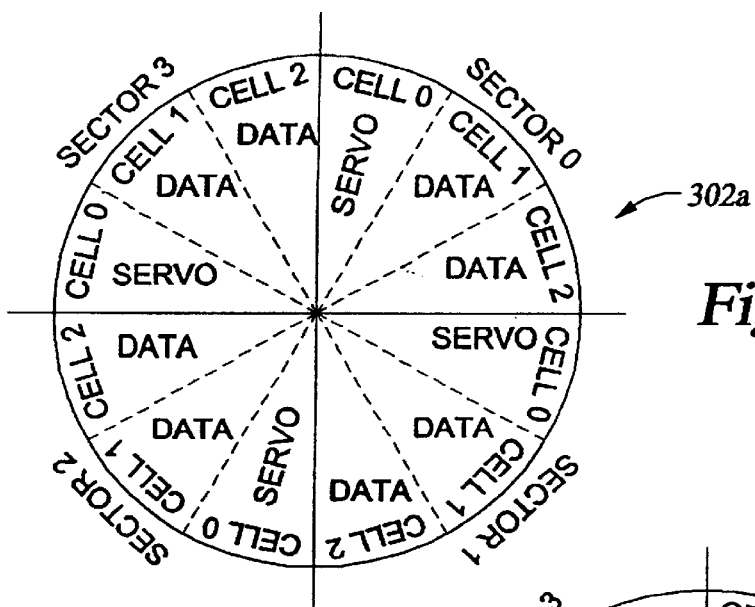
FIG. 5A, FIG. 5B, and FIG. 5C are top surface plan views of the three disks in the disk drive storage system of FIG. 3.
Figure 5B:
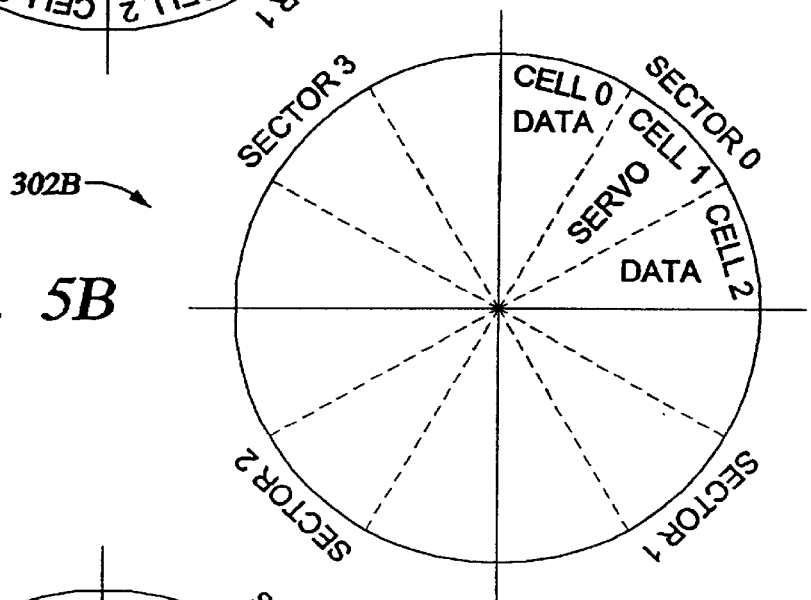
Figure 5C:
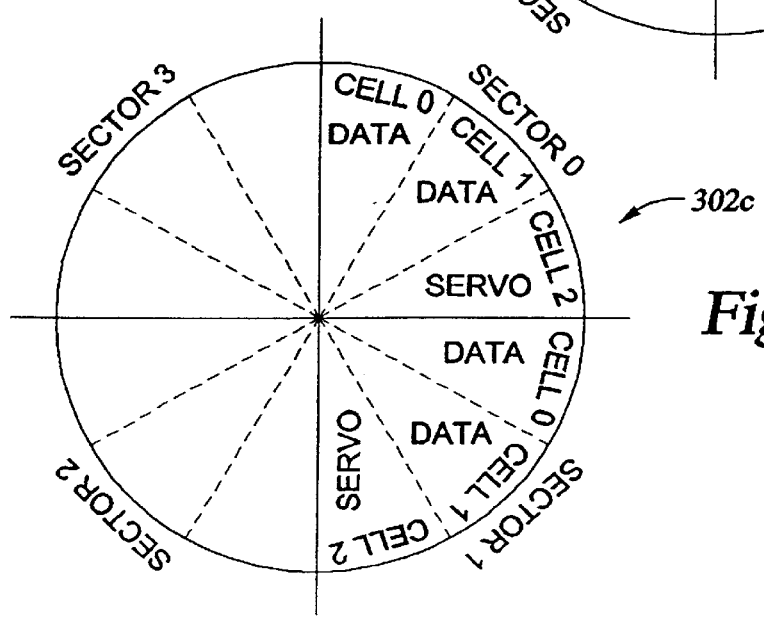

FIG. 5 shows the distribution of cells for the three-disk DASD system 300 of FIG. 3 for one embodiment of the present invention, having six different disk surfaces. FIG. 5 shows that the system 300 is a 4-sector, 3-cell implementation of the present invention. Therefore, each disk surface is divided into four sectors. The four sectors on any one disk are of equal size and are labeled Sector 0, Sector 1, Sector 2, and Sector 3. Dashed radial lines indicate the boundaries of the respective sectors. It should be understood that the cells are not defined by actual recorded radial lines on the respective disk surfaces, rather, the cell lines are a convenient fiction for purposes of illustration. The arrangement of cells is the same for Surface 0 and Surface 3 on the first disk 302a. The arrangement of cells is the same for Surface 1 and Surface 4 on the second disk 302b, and the arrangement of cells is the same for Surface 2 and Surface 5 on the third disk 302c. A different number of sectors and cells from that shown may be provided.

Each sector on a disk surface may be divided into three cells. For example, FIG. 5 shows Sector 0 of the first disk 302a having Cell 0, Cell 1, and Cell 2. Likewise, FIG. 5 shows Sector 1 having Cell 0, Cell 1, and Cell 2, shows Sector 2 having Cell 0, Cell 1, and Cell 2, and shows Sector 3 having Cell 0, Cell 1, and Cell 2. In each sector of the exemplary embodiment, one of the three cells contains servo data, and there is no servo pattern data recorded in the other sector cells. Thus, only one cell per disk sector contains servo pattern data. The arrangement of cells on the second disk 302b and on the third disk 302c is not completely shown but should be readily apparent in view of the first disk 302a.

The servo cells and the customer data cells are arranged in the servo control system of the DASD 300 such that, at any given time, at least one servo cell is generating a servo readback signal. That is, for any one of the six disk surfaces, the PES signal is generated only when the read/write head is positioned over one of the servo cells on that disk surface. FIG. 5 shows that the PES signal from the read/write head 306 associated with Surface 0 of the first disk 302a is generated from the readback signal that is transduced when the first arm positions the head over Cell 0 of Sector 0, and again when the head is positioned over Cell 0 of Sector 1, Cell 0 of Sector 2, and Cell 0 of Sector 3. This distribution of servo cells among the disk sectors is repeated for Surface 3 (the reverse side of the first disk), so that the PES signal generated from the read/write head associated with Surface 3 of the first disk is transduced simultaneously with Surface 0. It should be understood that other surfaces may be arranged to produce the PES signal simultaneously with Surface 0, without departing from the teachings of this invention.

The PES signal from the read/write head 306 associated with Surface 1 of the second disk 302b is generated from the readback signal that is transduced when the second arm positions the head over Cell 1 of Sector 0, Cell 1 of Sector 1, Cell 1 of Sector 2, and Cell 1 of Sector 3. The PES signal from Cell 1 also is generated when the third arm positions the read/write head over Surface 4 of the second disk. FIG. 5 shows that the PES signal from the read/write head 306 associated with Surface 2 of the third disk 302c is generated from the readback signal that is transduced when the second arm positions the head over Cell 2 of Sector 0, Cell 2 of Sector 1, Cell 2 of Sector 2, and Cell 2 of Sector 3. Those skilled in the art should be able to determine the arrangement of servo cells and customer data cells for DASD systems having different numbers of disk surfaces, sectors, and cells in view of this description.

Disk Drive Controller

Referring back to FIG. 3, the operation of the DASD disk drive 300 is managed by a disk drive controller 312, which also serves as an interface between the disk drive and a host computer 313. The host computer may comprise, for example, a desktop computer, a laptop computer, a mainframe computer, or any other digital processing device for which storage of data on a disk is desired. The disk drive controller 312 includes a central processor unit (CPU) 314 that executes program instructions stored in controller memory 315 to implement the desired operation, as described below.

The disk drive controller 312 includes a readback signal pre-amplifier circuit 316 ("pre-amp"), which receives electrical representations of servo patterns sensed by the read/write heads 306 from the disks 302. The pre-amp 316 serves a dual purpose by amplifying either data signals or servo signals, depending on whether the associated read/write head 306 is positioned over stored customer data or over servo pattern data, respectively. Thus, the amplified signal from the pre-amp 316 is directed to two processing channels: a servo channel 318 and a customer data channel 320. The pre-amp includes two sets of amplification circuitry, one set 316a for servo data only, and another set 316b for customer data. A write circuit 317 is provided to supply the read/write head 306 with customer data signals from the data channel 320.

The data channel 320 generally reads and writes data to and from the disk 302 in response to requests from the host computer 313 to read or write the customer data. The write circuit 317 is connected only to the customer data channel 320. The pre-amp 316b, when operating in conjunction with the customer data channel, amplifies the disk readback signal from the read/write head 306 and directs the readback signal to an automatic gain control and filter circuit 321. A data pulse detector 322 receives the analog readback signal from the circuit 321 and forms digital data pulses corresponding to the analog signal. Next, a read processor 324 converts the data pulses into formatted data strings that are compatible with the host computer 313. The data channel 320 operates in reverse order to write customer data to the disk 302, receiving data from the host computer 313 at a write processor 325 of the data channel 320. In the absence of a write inhibit signal, the write processor formats the data and provides it to the write circuit 317, where the formatted data is recorded onto the disk 302 by the head 306.

Figure 1:
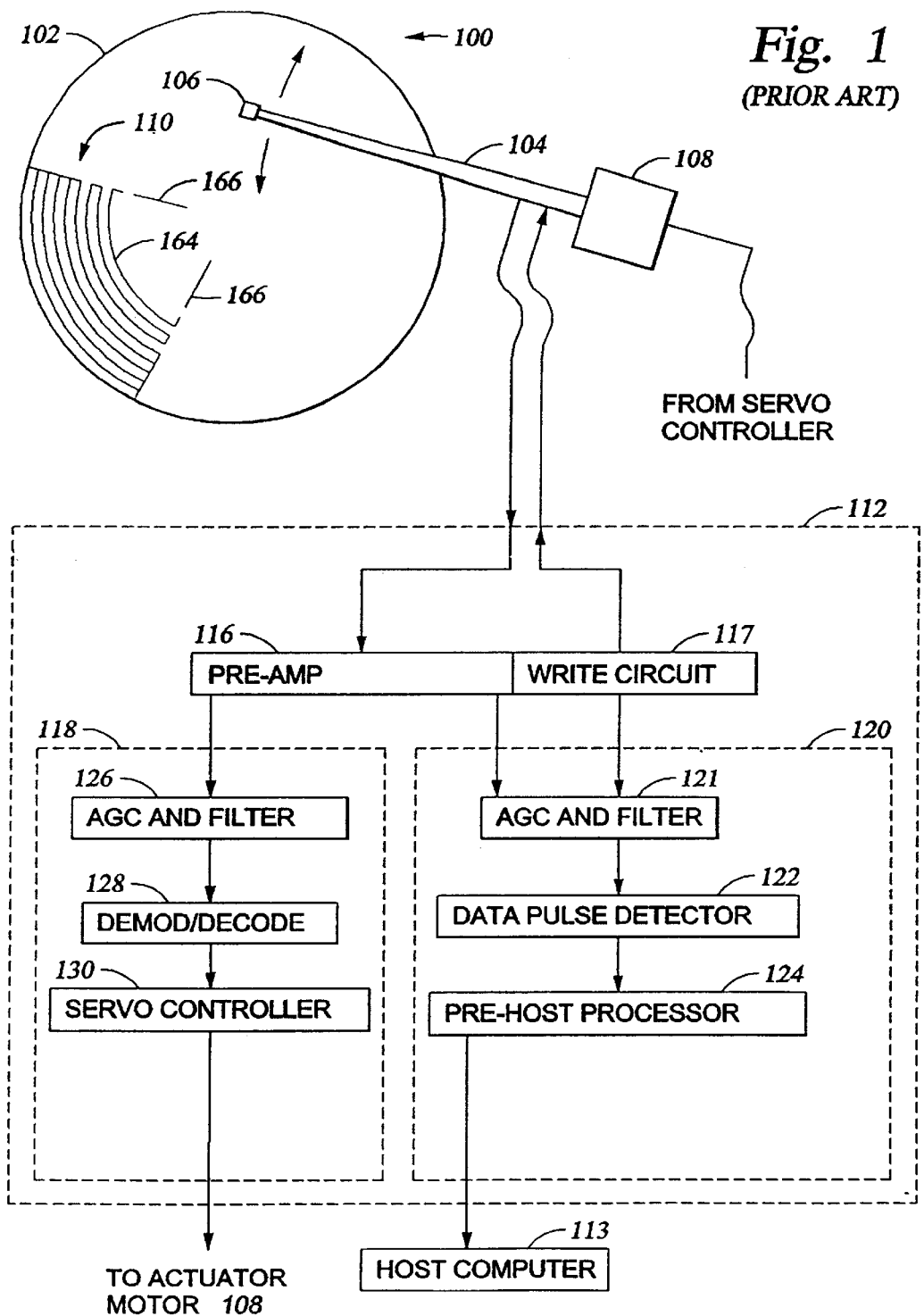
FIG. 1 is a schematic block diagram representation of a conventional disk drive storage system.
Figure 2:
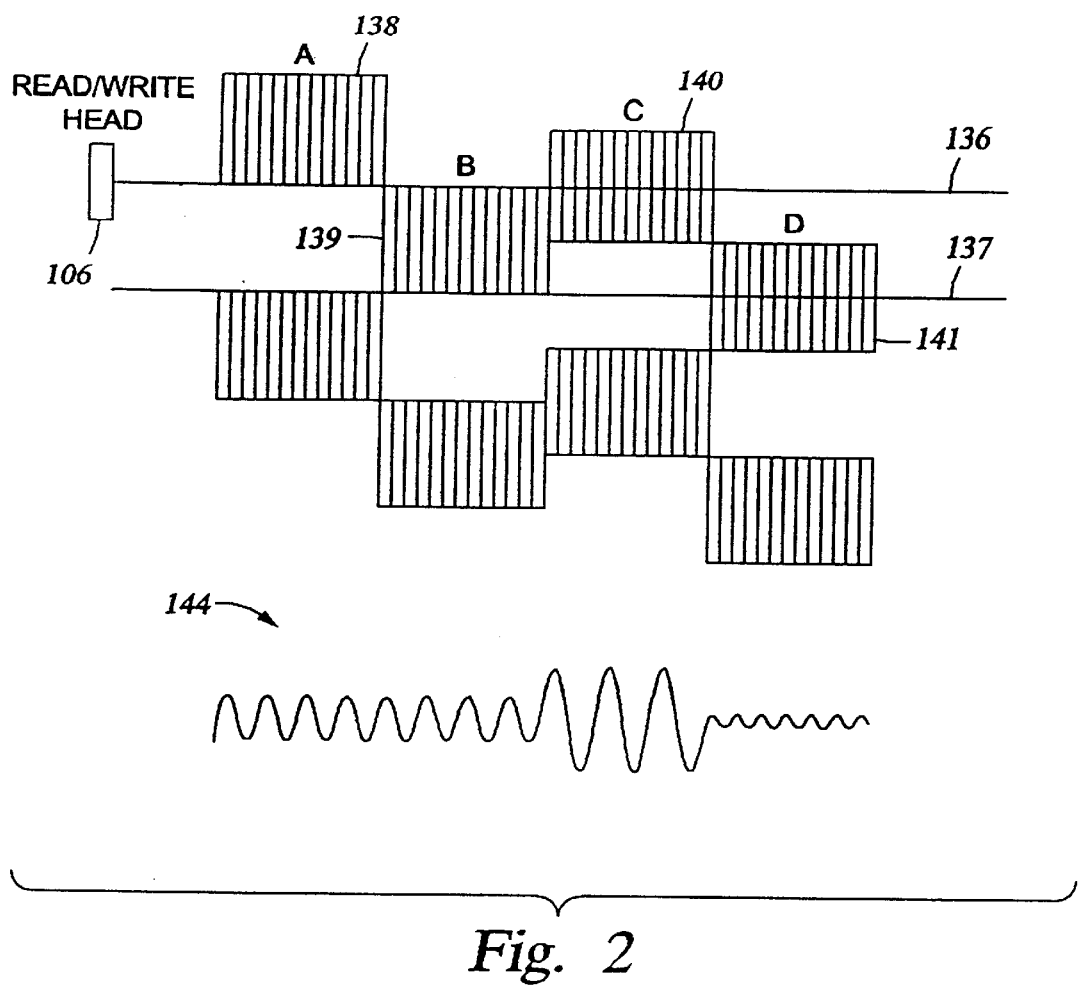
FIG. 2 is an illustration of the analog readback signal generated by the read/write head 106 shown in FIG. 1 when transducing a servo pattern.

The servo channel 318 generally reads servo data from the disk 302 to aid in properly positioning the read/write head 306. When operating in conjunction with the servo channel 318, the pre-amp 316a amplifies servo signals produced when the read/write head 306 senses servo patterns. Those skilled in the art will understand that the readback signal from the head comprises transduced A, B, C, D servo patterns of the type illustrated in FIG. 2. The servo channel 318 includes an automatic gain control (AGC) and filter circuit 326, which may comprise any one of various known circuits for automatically adjusting the readback signal gain and filtering it. The output of the AGC and filter circuit comprises processed A, B, C, D servo data. Next, a demodulator/decoder 328 receives the processed readback signal and derives P and Q quadrature data, from which a position error sensing (PES) signal is generated. Those skilled in the art will understand how to derive the P and Q data and how to generate the PES signal, without further explanation. Those skilled in the art will also understand that the PES signal is related to the position of the read/write head 306 with respect to the desired track center and is indicative of the read/write head position error.

The PES signal is provided to a sampler 330 and to a shock detector 332. In the preferred embodiment, program steps stored in the controller memory 315 are executed under control of the CPU 314, and implement the desired operation of the sampler and shock detector. Alternatively, the sampler and shock detector may be implemented in special circuitry to perform the desired operating steps.

Sampler and Servo Controller

In the preferred embodiment of FIG. 3, the sampler 330 controls the data that is provided to a servo controller 334, which uses the PES data to generate a control signal that, when provided to the actuator motor 308, controls the position of the read/write head 306. As noted above, the servo information recorded on the disk 302 is recorded such that only one cell per sector contains servo data, so that only the servo information readback signal from the disk surface of interest is used for position control. That is, if the top surface 402 of the first disk 302a is being accessed for read or write operation, then only the readback signal from the head 306 of the first arm 304a is used for position control, so that the servo information from the first cell ("Cell 0") is used to generate a PES signal. Similarly, if the top surface 404 of the second disk 302b is being accessed, then the readback signal from the second head of the second arm 304b alone is used by the servo controller, so that only servo information from the second cell ("Cell 1") is used to generate a PES. Likewise, if the top surface 406 of the third disk 302c is being accessed, then only the readback signal from the bottom head of the third arm 304c is used by the servo controller to generate a PES. A similar allocation of disk surfaces and servo readback signal is implemented for the other disk surfaces, so that the readback signal from the top head of the second arm 304b is used for the bottom surface 408 of the first disk 302a, the readback signal from the top head of the third arm 304c is used for the bottom surface 412 of the second disk 302b, and the readback signal from the top head of the fourth arm 304d is used for the bottom surface 416 of the third disk 302c to generate a PES.

It is the sampler 330 that ensures the readback signal from the appropriate arm is provided to the servo controller 334. In the preferred embodiment, the CPU 314 determines which disk surface is of interest, and commands the sampler 330 to direct the readback signal from the appropriate arm 304 for the surface of interest to the servo controller 334. The surface of interest depends on the location of data being read or recorded. In this way, the proper one of the sector cells is used for generating a PES signal and ensuring proper track following. It should be appreciated that the readback signal will not contain any position information if it is selected by the sampler from an inappropriate head for a disk surface of interest.

Shock Detector and Write Processor

The shock detector 332 receives the demodulated readback signal in the servo channel 318 upstream of the sampler 330, and therefore constantly receives a signal more frequently than is used for controlling the head position. That is, the shock detector receives a readback signal for every servo sector cell when the heads 306 are located over the servo information area between the radial lines 366, 368 depicted in FIG. 3. For purposes of analysis, the received readback signal may be divided into waveform portions that correspond to the sector cells.

Figures 6, 7:
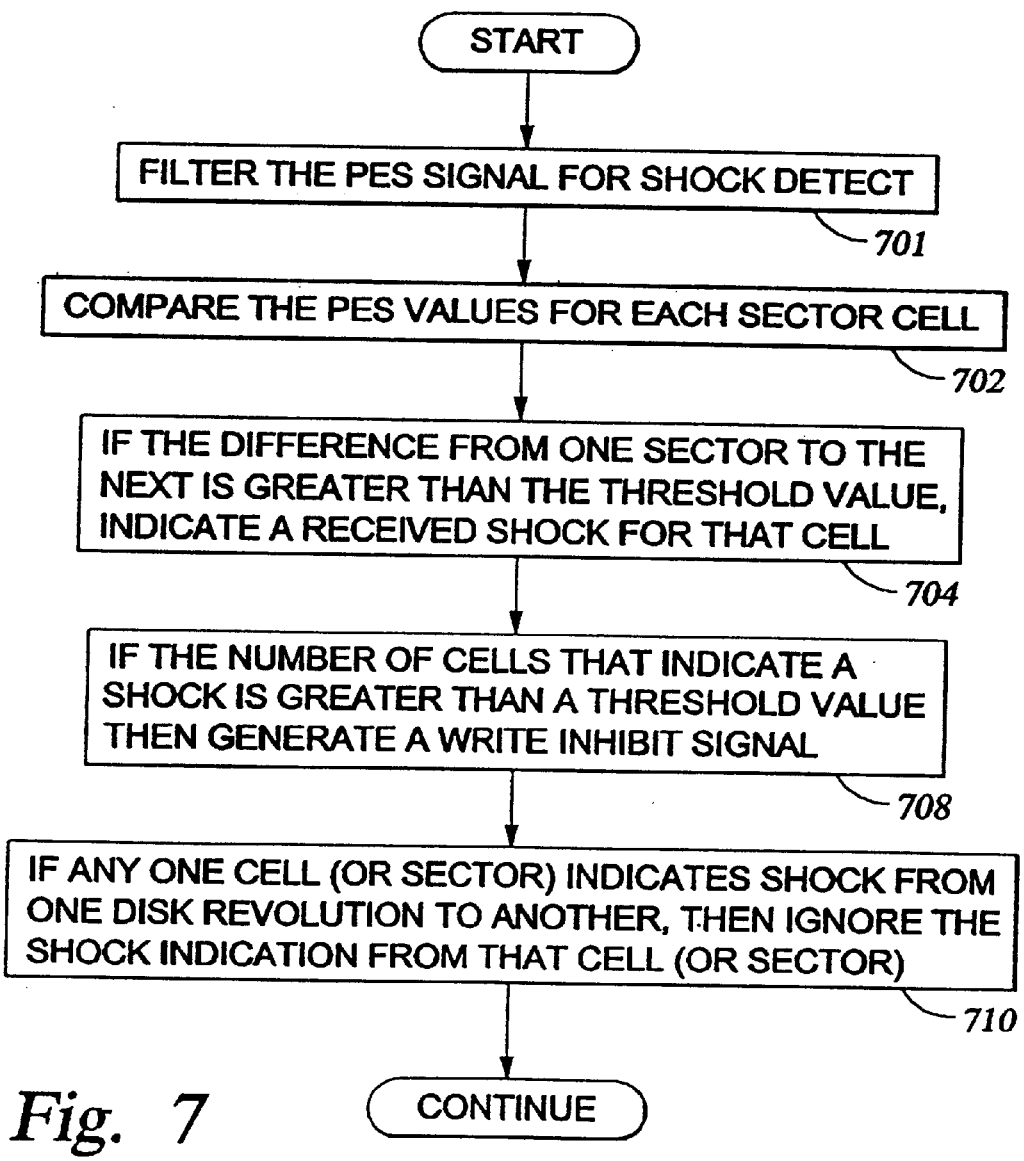
FIG. 6 is a representation of the readback signal received by the shock detector illustrated in FIG. 3.
FIG. 7 is a flow diagram of the processing steps performed by the disk drive controller illustrated in FIG. 3.

FIG. 6 shows a representation of the readback signal 602 received by the shock detector 332 from the demodulator/decoder 328 (FIG. 3) over one sector of a disk. Because there are four sectors in the illustrated system, the signal 602 will be repeated four times for a complete revolution of the disk, once per sector. The demodulated PES signal is a single digital value received once per cell. Therefore, the readback PES signal comprises three digital values received over each disk sector, represented in FIG. 6 as three pulses. The output of the shock detector is a comparison of the difference between the PES signal for a cell with the previous PES value for the cell. If the difference for at least one cell is greater than a threshold value, then a shock event is declared.

For any given disk surface of interest, it should be noted that a PES signal value will be received only once per sector. For example, if Surface 0 (the top surface of the first disk 302a) is of interest, then a PES signal will be received by the shock detector only when Cell 0 of each sector is being read by the read/write head. For Surface 0, no PES signal will be received from Cell 1 or from Cell 2 of Sector 0, which FIG. 5 shows contains customer data, not servo pattern data. The bottom surface of the first disk (Surface 4) has the same surface pattern as Surface 0, and therefore the readback signal generated by Surface 4 should be the same as the signal 602 generated by Surface 0.

It should be apparent that the readback signal generated by the second disk surface (Surface 1) will provide a PES signal only when the read/write head is positioned over the cells designated Cell 1. A similar readback signal is associated with the fifth disk surface, Surface 4. Finally, it should be apparent that the readback signal generated by the third disk surface (Surface 2) will provide a PES signal only when the read/write head is positioned over the cells designated Cell 2 of the Surface 2 cells.

Processing Steps of the Controller

FIG. 7 shows the shock detector processing steps performed by the DASD servo control system 300. The first processing step, represented by the FIG. 7 flow diagram box numbered 701, is an optional PES signal filtering step. In the filtering step 701, bandpass filter logic optionally included in the shock detector 332 recognizes the frequency signature or frequency value in the PES data that typically indicates a system shock. That is, a match of the PES data for a cell with a shock frequency signature will result in a shock indication for that cell. In the next processing step, represented by the FIG. 7 flow diagram box numbered 702, the controller 312 compares the PES data for each sector cell as the PES data is received. Next, if the difference between PES values from one sector to the next is greater than a threshold value, then a shock is indicated for that cell. This processing step is indicated by the flow diagram box numbered 704.

If the number of cells from any one sector that indicate a shock is greater than a threshold value, then the shock detector 332 generates a write inhibit signal that is provided to the write processor 324. This processing is represented by the FIG. 7 flow diagram box numbered 708. Such processing ensures that write operations will not take place if such operations could result in unrecoverable data errors, such as typically result from write operations that take place during a shock. Many different schemes may be used for determining when to issue a write inhibit signal. For example, a write inhibit signal may be generated whenever at least a predetermined percentage of the sector cells indicate the system has experienced a shock. Thus, in the illustrated embodiment having three servo cells per sector, a write inhibit signal may be issued if three or more of the five sector cells indicate a shock, but no write inhibit signal will be issued if two or less of the sector cells indicate a shock.

Consistent shock indications from a single cell or sector on successive disk revolutions are highly unlikely, and therefore the preferred embodiment of the shock detector compensates for repeated shock indications by ignoring them. This is represented by the FIG. 7 flow diagram box numbered 710. In accordance with this processing step, if any one cell (or sector) repeatedly indicates a shock from one disk revolution to another, then the shock indication from that cell (or sector) is ignored by the shock detector 332 in determining whether to issue a write inhibit signal. Many other compensation schemes for repeated shock indications are possible. For example, a shock indication that extends for a predetermined number of consecutive cells or sectors may indicate a likely erroneous shock indication, and can be ignored. If desired, the shock detector 332 can ignore all shock indications from the affected cells or sectors (indicating a damaged cell or sector) for a limited time, before restoring normal operation. Alternatively, the shock detector can ignore shock indications from all cells or sectors for a limited time if any erroneous shock indications are received. Other compensation schemes for repeated shock indications will occur to those skilled in the art.

Controller Tasks

Figure 8:
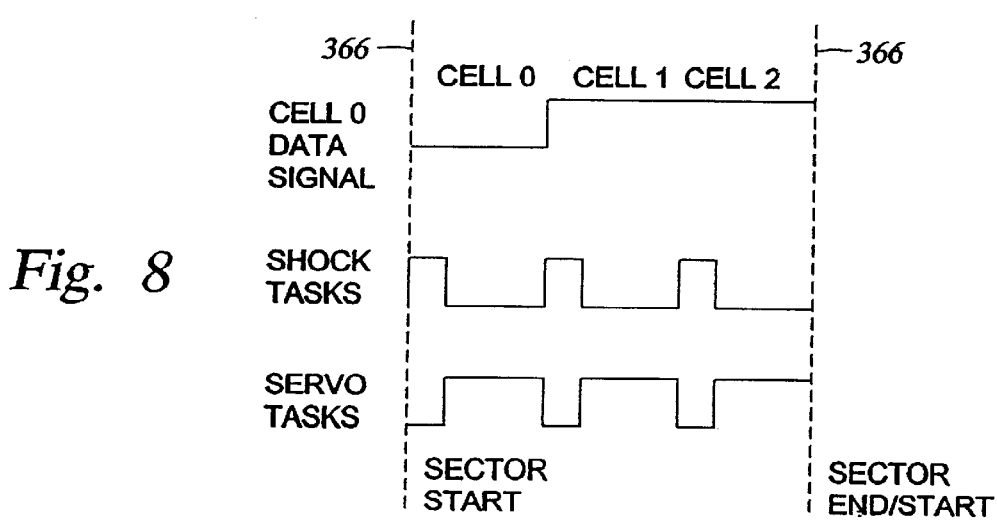
FIG. 8 is a time line representation of the processing steps performed by the FIG. 3 disk drive controller during servo sector processing.

FIG. 8 is a time line representation of the tasks performed by the CPU 314 of the controller 312 (see FIG. 3) when processing the servo readback signal. At the left edge of the FIG. 8 representation is a vertical line 366 corresponding to the beginning of a sector (Sector Start). At the right edge of the FIG. 8 representation is another vertical line 366 corresponding to the end of the first sector and the beginning of the next sector (Sector End/Start). The three cells within a sector are indicated across the top of FIG. 8 by Cell 0, Cell 1, and Cell 2.

The first horizontal signal at the top of FIG. 8 represents the customer data readback signal for Cell 0 of Surface 0, to represent the reading of customer data and the timing of CPU tasks relative to the timing of the sector boundary lines 366 as they are encountered on the disk 302. Thus, the readback signal line is not active when servo information is being read from a surface of interest.

During processing of each cell for a disk surface of interest, servo data is first read and demodulated (not indicated in the time line of FIG. 8). After reading servo data, the CPU performs shock tasks for that particular cell, and then performs servo tasks for that cell. The servo data from other cells of the DASD is read while customer data is being read from the other cells of the sector of interest. During the servo task operating intervals, the CPU performs operations such as sampling to ensure processing the proper readback servo data, processing the P and Q values to generate a PES signal during shock, performing position predicting for more efficient disk servo control, implementing write inhibit commands, and performing other control tasks.

Because the illustrated system includes three cells per sector, the shock detecting tasks pulse train in FIG. 8 shows three separate pulses per sector area of the disk. A shock detector service interrupt may be generated by servo controller circuitry each time a sector cell boundary is encountered. Thus, the shock detecting tasks are performed during each time period while the sector cell servo information is being processed by the CPU for a single sector cell, and the tasks occur three times per servo sector.

Alternative Embodiment—Duplicate Arm Electronics

In accordance with the present invention, servo data is read from one of the disks while customer data is being read and while customer data is being recorded from other disks. Therefore, disk systems constructed in accordance with the invention will include two sets of readback signal paths from the read/write head to the pre-amp. These signal paths are typically referred to collectively as the arm electronics, and therefore disk systems constructed in accordance with the invention are said to have two sets of arm electronics.

In the FIG. 3 embodiment described above, one set of arm electronics 316a was used for servo data and the other set of aim electronics 316b was used for the customer data. A different pre-amp circuit was provided for each set. In the FIG. 3 embodiment, the readback signal from all the read/write heads was provided to both sets of arm electronics, with the arm electronics 316b for customer data always selecting the surface of interest, and the servo arm electronics 316a selecting a different head for each servo identification cell being processed. Thus, there are two sets of arm electronics, but they are not identical. An advantage of this configuration is that the servo-dedicated arm electronics circuitry 316a can be optimized for servo signal processing, rather than being integrated with the customer data arm electronics, as is conventional.

Figure 9:
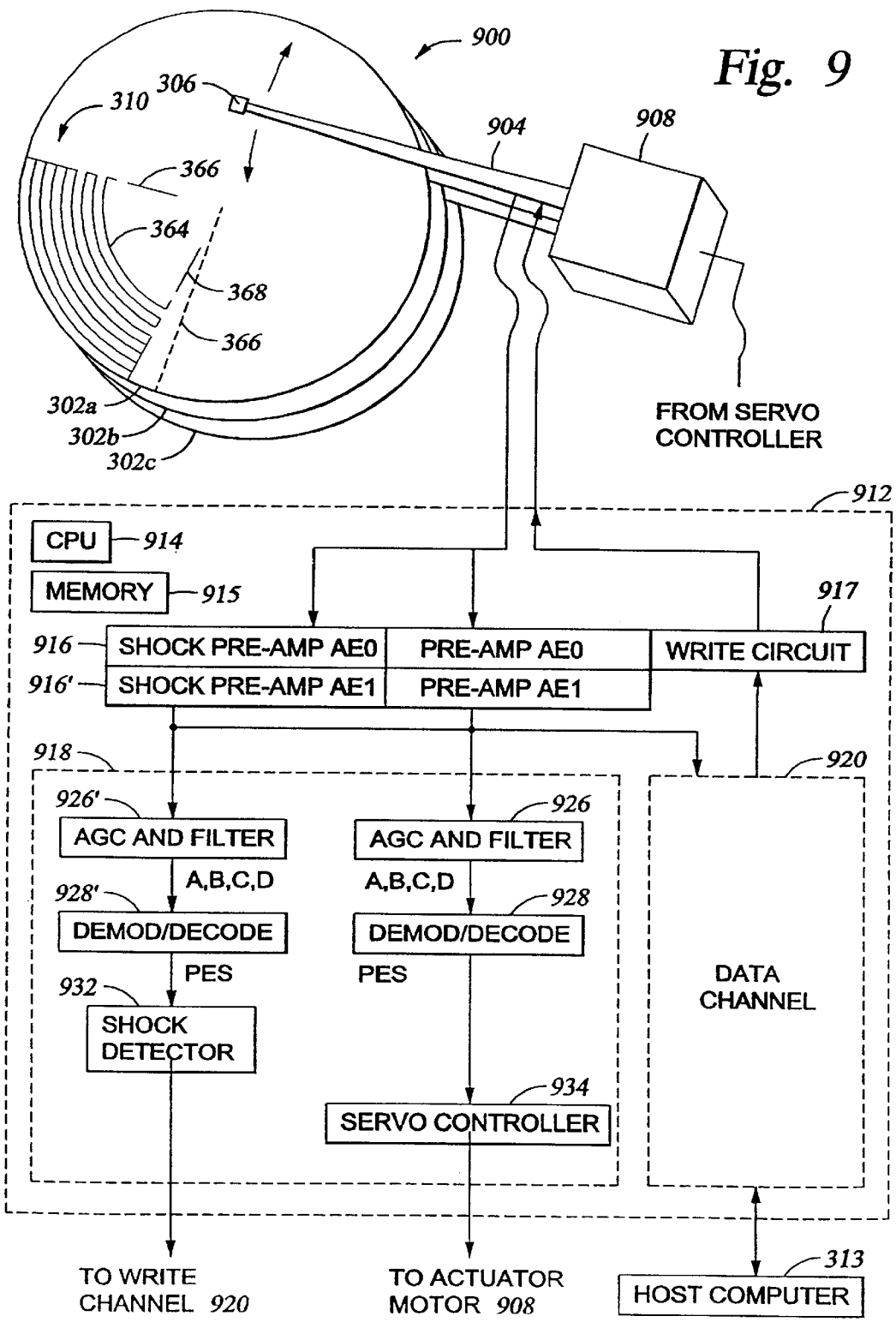
FIG. 9 is a schematic block diagram representation of an alternative embodiment of a disk drive storage system constructed in accordance with the present invention, having duplicate arm electronics.

FIG. 9 shows an alternative embodiment of a DASD disk system 900 that includes two duplicate sets of arm electronics, each set being used for both customer data and servo processing. Some DASD systems with multiple disks are currently provided with two duplicate sets of arm electronics, due to the large number of heads in the systems. This is particularly true for DASD systems that are used as file servers. For such large DASD systems, the FIG. 9 embodiment will be preferred over the FIG. 3 embodiment, as it will be easier to integrate the features of the present invention into such duplicate-arm systems.

In the FIG. 9 embodiment, a first set of arm electronics circuitry ("AE0") is used for a first group of read/write heads, and a second set of arm electronics ("AE1") is used for a second group of read/write heads. The AE1 box indicates structure that is identical to that for AE0. In the illustrated six-head system, it would be logical to use the first set AE0 for the first three heads and to use the second set AE1 for the last three heads. Thus, if Surface 0 was the disk surface of interest, then AE0 would be used to amplify both customer data and servo data from Surface 0, and AE1 would be used by the controller 934 to ripple through the read/write heads to detect servo information from the different servo information cells of the remaining servo sectors. For Surface 0, the servo information would come from Cell 1 and Cell 2 for shock detection come from AE1 (for Surface 5 and Surface 6), and the servo information for Cell 0 would come from AE0, Surface 0. The servo information from Cell 0 would be used both for shock detection and for positioning the read/write head over Surface 0.

More particularly, the FIG. 9 system 900 includes multiple arms 904 that are actuated by a motor 908 under control of a servo controller 934. The arms 904 provide the readback signal to dual pre-amplifiers, one servo/write pre-amp 916 for servicing the first set AE0 of arm electronics, and the other 916' for servicing the second set AE1. Thus, the servo/write pre-amp 916 receives the readback signal from any of the first three heads, and the second pre-amp 916' receives the readback signal from any of the last three heads. The readback signal is provided to a servo channel 918 and to a customer data channel 920. Thus, there are two sets of signal paths from the read/write heads 306 to the pre-amps 916, 916', and duplicate signal paths from the preamps to the servo and data channels.

The respective arm electronics AE0, AE1 provide an amplified signal for purposes of processing customer data for the data channel 920, and for purposes of processing for the shock detector 932 and for generating the servo PES signal of the servo controller 934 in the servo channel 918. It should be understood that the data channel 920 includes data read circuitry and data write circuitry such as illustrated in FIG. 3 for the data channel 320. Accordingly, both of the pre-amplifiers 916, 916' are shown supplying a signal to the customer data channel 920.

In addition to having duplicate arm electronics, the FIG. 9 system 900 includes dual servo information processing paths through the servo channel 918. In one path, the amplified readback signal is processed in a demodulator/decoder 928 and then provided to a sampler 930 that selects cell signals in a manner as described above in conjunction with the sampler 330 of FIG. 3. The sampled servo signal is provided to the servo controller 934, which generates the appropriate control signal to the actuator motor 908 of the arms 904. In the other servo information processing path, after the readback signal is processed by the AGC and filter 926' of the second path and then processed in another demodulator/decoder 928', the signal is provided to a shock detector 932 that operates as described above in conjunction with the shock detector 332 of FIG. 3. Thus, the shock detector provides write inhibit commands to the write processor (not illustrated in FIG. 9) of the customer data channel 920.

ADVANTAGES OF THE INVENTION

In both of the embodiments described above, the present invention provides a dual path for processing the servo readback signal so that a servo controller processes the readback signal to generate servo commands and a shock detector processes the readback signal to generate write inhibit commands due to shock. In this way, the invention provides a direct access storage device (DASD) with a servo control system that detects a staggered servo pattern from multiple servo sector cells and compares the cell-to-cell readback signal independently of the position error signal (PES) to detect shock and generate write inhibit commands. The shock detector compares servo data from each cell of a sector, determines if the DASD has experienced a shock that likely would cause erroneous data write operations, and inhibits data write operations if needed. Shock detection and response can thereby be implemented without costly accelerometers, but with sufficient accuracy for effective shock response. In this way, the DASD detects physical shocks and responds with appropriate write inhibit commands without the extra cost, size, and weight of complicated hardware shock detection devices, such as accelerometers.

The present invention has been described above in terms of presently preferred embodiments so that an understanding of the present invention can be conveyed. There are, however, many configurations for disk drive control systems not specifically described herein but with which the present invention is applicable. The present invention should therefore not be seen as limited to the particular embodiments described herein, but rather, it should be understood that the present invention has wide applicability with respect to disk drive control systems generally. All modifications, variations, or equivalent arrangements and implementations that are within the scope of the attached claims should therefore be considered within the scope of the invention.

We claim:

1. A method of controlling operation of a storage media of a direct access storage device in which write operations are used to record data on the storage media and a servo pattern is recorded on the storage media in multiple sectors that are subdivided into sector cells, the method comprising the steps of:

transducing the servo pattern and producing a readback signal that indicates the transducing head position relative to the sectors of the storage media;

comparing the readback signal values from the corresponding cell of successive sectors across the storage media;

indicating a shock if the step of comparing indicates a difference between successive sectors that is greater than a predetermined shock threshold; and generating a write inhibit signal if the number of cells for which a shock is indicated is greater than a predetermined threshold value.

2. A method as defined in claim 1, further including the step of responding a shock indication for a sector cell by ignoring the shock indication if that cell indicates an isolated shock condition.

3. A method as defined in claim 2, wherein a shock indication is considered an isolated shock condition if the shock is indicated on more than one successive cycle of the readback signal for the cell.

4. A method as defined in claim 1, wherein the step of indicating a shock further comprises the step of indicating a shock if the readback signal values for a cell matches a predetermined shock frequency signature.

5. A method as defined in claim 1, wherein the step of transducing further comprises the step of detecting if the readback signal matches a predetermined shock frequency signature.

6. A method as defined in claim 1, wherein the step of transducing further comprises producing a readback signal for a first set of direct access storage device heads from a first arm electronics circuit, and producing a readback signal for a second set of direct access storage device heads from a second arm electronics circuit.

7. A method as defined in claim 1, wherein the step of transducing further comprises producing a readback signal for the servo pattern from a servo-dedicated arm electronics circuit.

8. A method as defined in claim 1, wherein the storage media comprises multiple recordable disks, and the step of comparing comprises receiving the readback signal from corresponding cells of successive sectors that are on different disk surfaces.

9. A data storage system comprising:

a magnetic storage medium having a servo pattern recorded on at least one servo track;

a head assembly having at least one read head for reading a servo pattern recorded in the multiple tracks and generating a readback signal;

a demodulation processor that receives the readback signal and produces a position error signal that indicates the read head position relative to a track; and a shock detector that receives the position error signal from each cell of a sector, compares the readback signal values from the corresponding cell of successive sectors across the storage media, indicates a shock if the comparison indicates a difference between successive sectors that is greater than a predetermined shock threshold, and generates a write inhibit signal if the number of cells for which a shock is indicated is greater than a predetermined threshold value.

10. A data storage system as defined in claim 9, wherein the shock detector responds to a shock indication for a sector cell by ignoring the shock indication if that cell indicates an isolated shock condition.

11. A data storage system as defined in claim 10, wherein a shock indication is considered an isolated shock condition if the shock is indicated on more than one successive cycle of the readback signal for the cell.

12. A data storage system as defined in claim 9, wherein the shock detector indicates a shock if the readback signal values for a cell matches a predetermined shock frequency signature.

13. A data storage system as defined in claim 9, wherein the demodulation processor determines if the readback signal matches a predetermined shock frequency signature and provides an indication to the shock detector.

14. A data storage system as defined in claim 9, wherein the demodulation processor processes a readback signal for a first set of direct access storage device heads from a first arm electronics circuit, and processes a readback signal for a second set of direct access storage device heads from a second arm electronics circuit.

15. A data storage system as defined in claim 9, wherein the demodulation processor processes a readback signal for the servo pattern from a servo-dedicated arm electronics circuit.

16. A data storage system as defined in claim 9, wherein the storage media comprises multiple recordable disks, and the shock detector receives the readback signal from corresponding cells of successive sectors that are on different disk surfaces.

17. A data storage system as defined in claim 9, further including a preamplifier that provides the readback signal to a servo controller that generates a servo control signal for controlling movement of the head and to the shock detector for indicating shock.

18. A data storage system as defined in claim 9, further including:
  a data channel preamplifier that provides the readback signal to a servo controller that generates servo control signal for controlling movement of the head; and
  a shock detector preamplifier that provides the readback signal to the shock detector for indicating shock.

19. A servo signal processor comprising:
  a servo signal sampler that receives a demodulated readback signal generated from a head assembly having at least one read head that reads a servo pattern recorded in multiple tracks of a storage media and produces a position error signal that indicates the read head position relative to a track, such that the servo signal sampler detects a sampled readback signal for a subdivided cell portion of a sector; and
  a shock detector that receives the readback signal from each cell of a sector, compares the readback signal values from the same cell of successive sectors across the storage media, indicates a shock if the comparison indicates a difference between successive sectors that is greater than a predetermined shock threshold, and generates a write inhibit signal if the number of cells for which a shock is indicated is greater than a predetermined threshold value.

20. A servo signal processor as defined in claim 19, wherein the shock detector responds to a shock indication for a sector cell by ignoring the shock indication if that cell indicates an isolated shock condition.

21. A servo signal processor as defined in claim 20, wherein a shock indication is considered an isolated shock condition if the shock is indicated on more than one successive cycle of the readback signal for the cell.

22. A servo signal processor as defined in claim 19, wherein the shock detector indicates a shock if the readback signal values for a cell matches a predetermined shock frequency signature.

23. A servo signal processor as defined in claim 19, wherein the servo controller determines if the readback signal matches a predetermined shock frequency signature and provides an indication to the shock detector.

24. A servo signal processor as defined in claim 19, wherein the servo controller processes a readback signal for a first set of direct access storage device heads from a first arm electronics circuit, and processes a readback signal for a second set of direct access storage device heads from a second arm electronics circuit.

25. A servo signal processor as defined in claim 19, wherein the servo controller processes a readback signal for the servo pattern from a servo-dedicated arm electronics circuit.

26. A servo signal processor as defined in claim 19, wherein the storage media comprises multiple recordable disks, and the shock detector receives the readback signal from corresponding cells of successive sectors that are on different disk surfaces.

27. A servo signal processor as defined in claim 19, further including a preamplifier that provides the readback signal to a servo controller that generates a servo control signal for controlling movement of the head and to the shock detector for indicating shock.

28. A servo signal processor as defined in claim 19, further including:
  a data channel preamplifier that provides the readback signal to a servo controller that generates servo control signal for controlling movement of the head; and
  a shock detector preamplifier that provides the readback signal to the shock detector for indicating shock.

* * * * *